United States Patent
Loew

(10) Patent No.: US 9,688,232 B1
(45) Date of Patent: Jun. 27, 2017

(54) AIR BAG SYSTEM FOR REAR SEAT CENTER OCCUPANT PROTECTION

(71) Applicant: Ford Global Technologies, LLC, Dearborn, MI (US)

(72) Inventor: Pattrick Loew, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/090,632

(22) Filed: Apr. 5, 2016

(51) Int. Cl.
*B60R 21/207* (2006.01)
*B60R 21/233* (2006.01)
*B60R 21/231* (2011.01)

(52) U.S. Cl.
CPC .......... *B60R 21/207* (2013.01); *B60R 21/233* (2013.01); *B60R 2021/23107* (2013.01); *B60R 2021/23153* (2013.01)

(58) Field of Classification Search
CPC ............... B60R 21/207; B60R 21/233; B60R 2021/23107; B60R 2021/23153; B60R 2021/23161
See application file for complete search history.

(56) References Cited

U.S. PATENT DOCUMENTS

| | | | |
|---|---|---|---|
| 5,499,840 A * | 3/1996 | Nakano | B60N 2/0705 280/730.1 |
| 2008/0129024 A1* | 6/2008 | Suzuki | B60R 21/23138 280/734 |
| 2010/0264631 A1* | 10/2010 | Tomitaka | B60R 21/231 280/730.2 |
| 2015/0158453 A1* | 6/2015 | Fujiwara | B60R 21/207 280/730.2 |
| 2015/0197209 A1* | 7/2015 | Fujiwara | B60R 21/231 280/730.1 |
| 2015/0274111 A1 | 10/2015 | Ishida et al. | |
| 2016/0159307 A1* | 6/2016 | Fujiwara | B60R 21/207 280/729 |
| 2016/0229369 A1* | 8/2016 | Thomas | B60R 21/207 |

FOREIGN PATENT DOCUMENTS

| | | |
|---|---|---|
| JP | H03281458 | 12/1991 |
| JP | H08132999 | 5/1996 |
| JP | 2000103310 | 4/2000 |
| JP | 2011116153 | 6/2011 |
| KR | 1020050029833 | 3/2005 |
| KR | 1020050110301 | 11/2005 |

* cited by examiner

*Primary Examiner* — Drew J Brown
(74) *Attorney, Agent, or Firm* — Frank MacKenzie; Bejin Bieneman PLC

(57) ABSTRACT

An airbag system for use in a passenger vehicle includes a first airbag and a second airbag and a first airbag module. The first airbag module is shaped for mounting in a first front seatback and includes a first bracket, a first airbag in a deflated condition disposed in the bracket, and an inflator connected to the airbag. The first airbag in an inflated condition is sized to span a gap between the first front seatback and a second front seatback. A second airbag in a deflated condition is included as part of one of the first airbag module and a second airbag module. The second airbag in an inflated condition overlays the first airbag on one of a forward side and a rearward side.

20 Claims, 5 Drawing Sheets

AIR BAG SYSTEM FOR REAR SEAT CENTER OCCUPANT PROTECTION

BACKGROUND

An occupant sitting in a rear center seat behind an open area has limited protection during a frontal impact event if there is no airbag system located in an area in front of such an occupant, with protection potentially being limited to that provided by seatbelts. An airbag that bridges a gap between two seatbacks and has a constant cross-sectional area may be prone to being deflected and not providing the desired resistance to impingement thereagainst by an occupant.

DETAILED DESCRIPTION

Introduction

A disclosed airbag system provides two overlapping airbags disposed in at least one airbag module for disposition in a seatback.

Relative orientations and directions (by way of example, upper, lower, bottom, rearward, front, rear, back, outboard, inboard, inward, outward, lateral, let, right) are set forth in this description not as limitations, but for the convenience of the reader in picturing at least one embodiment of the structures described. Such exemplary orientations are from the perspective of an occupant seated in a driver seat, facing a dashboard.

Exemplary System Elements

Figure 1:
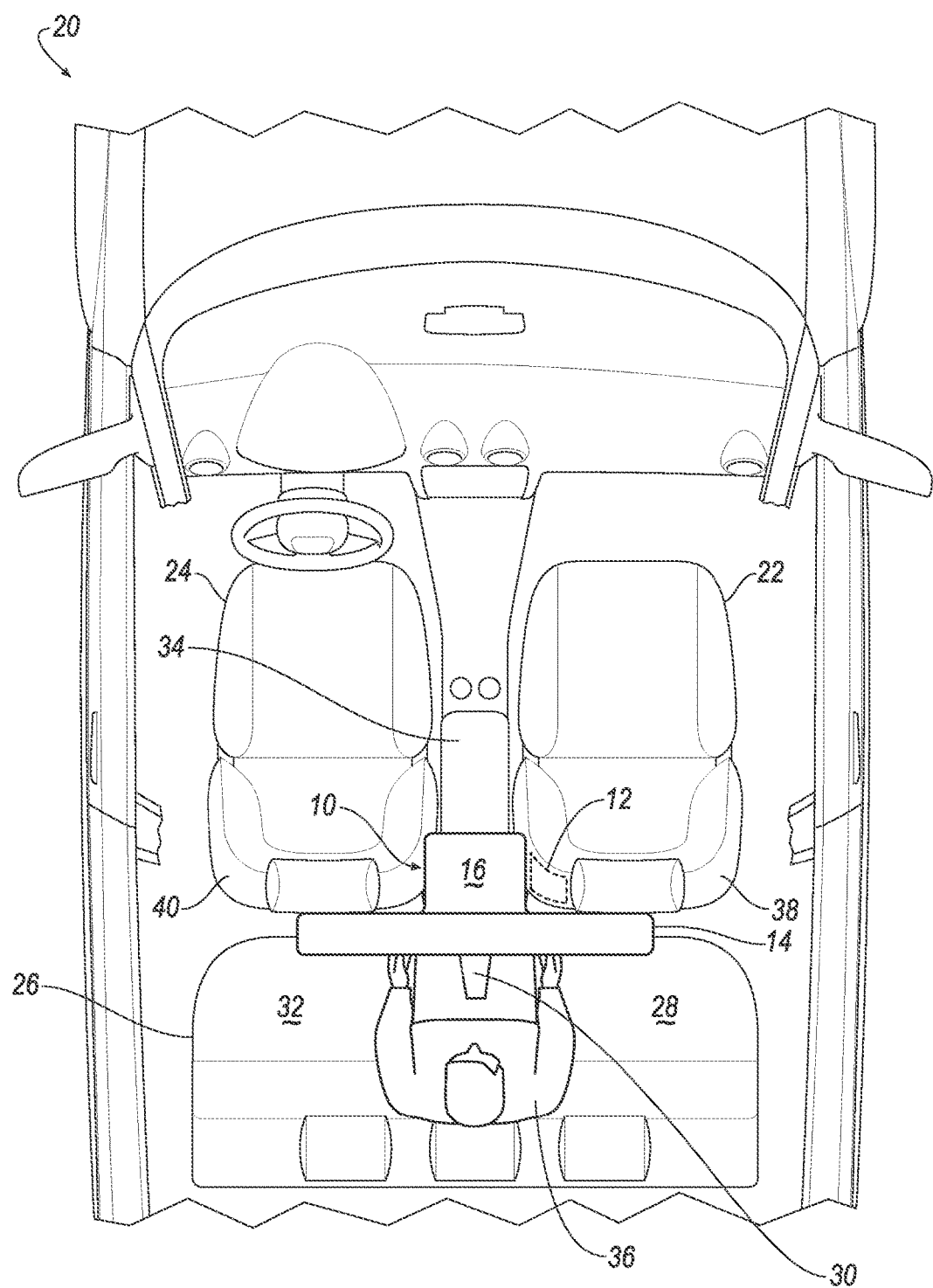
FIG. 1 is a top view of a first exemplary airbag in a deployed condition.
Figure 2:
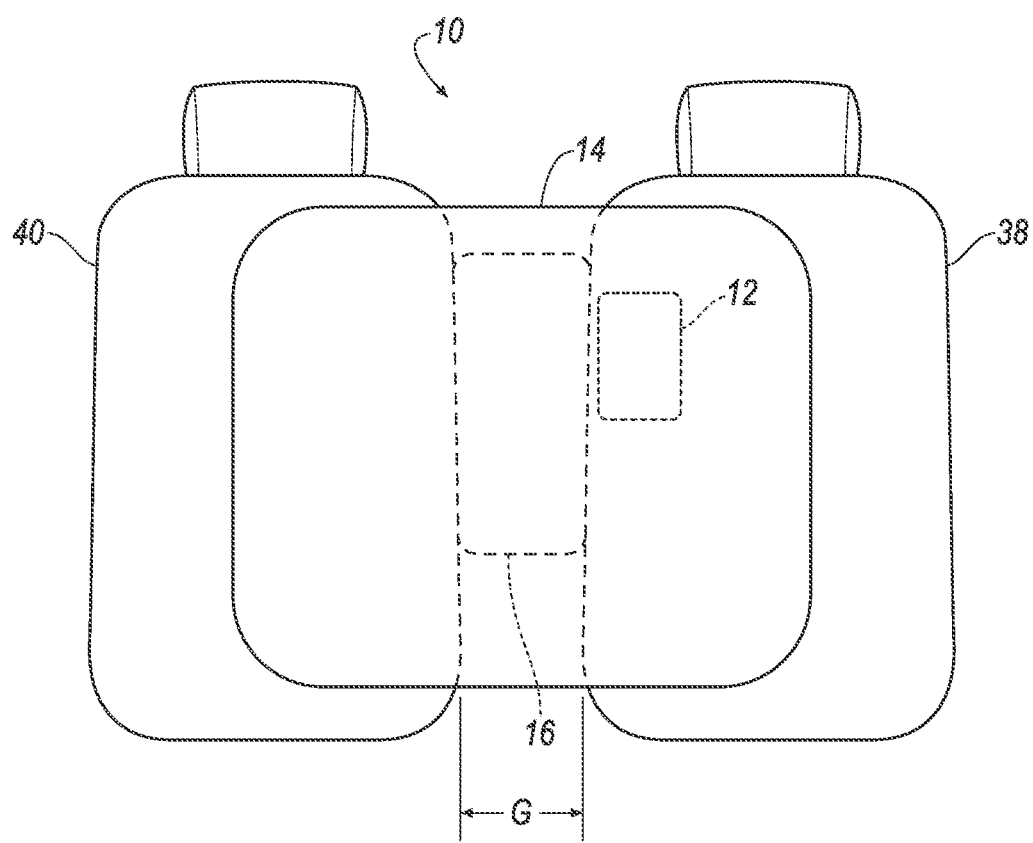
FIG. 2 is schematic rear view of the exemplary airbag of FIG. 1.
Figure 3:
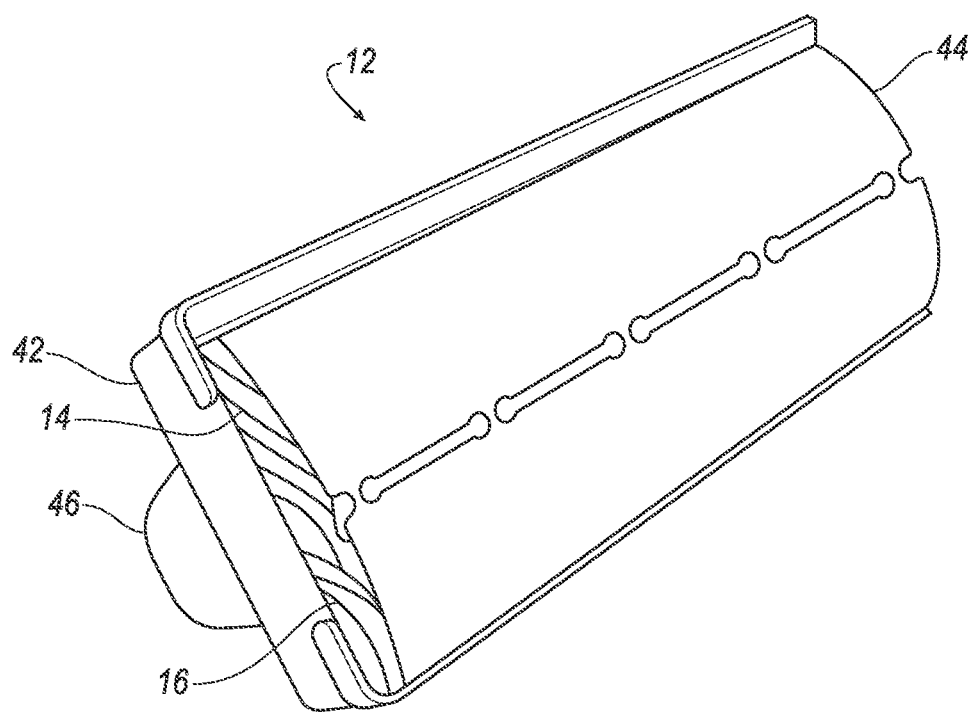
FIG. 3 is a perspective view of an exemplary airbag module.
Figure 4:
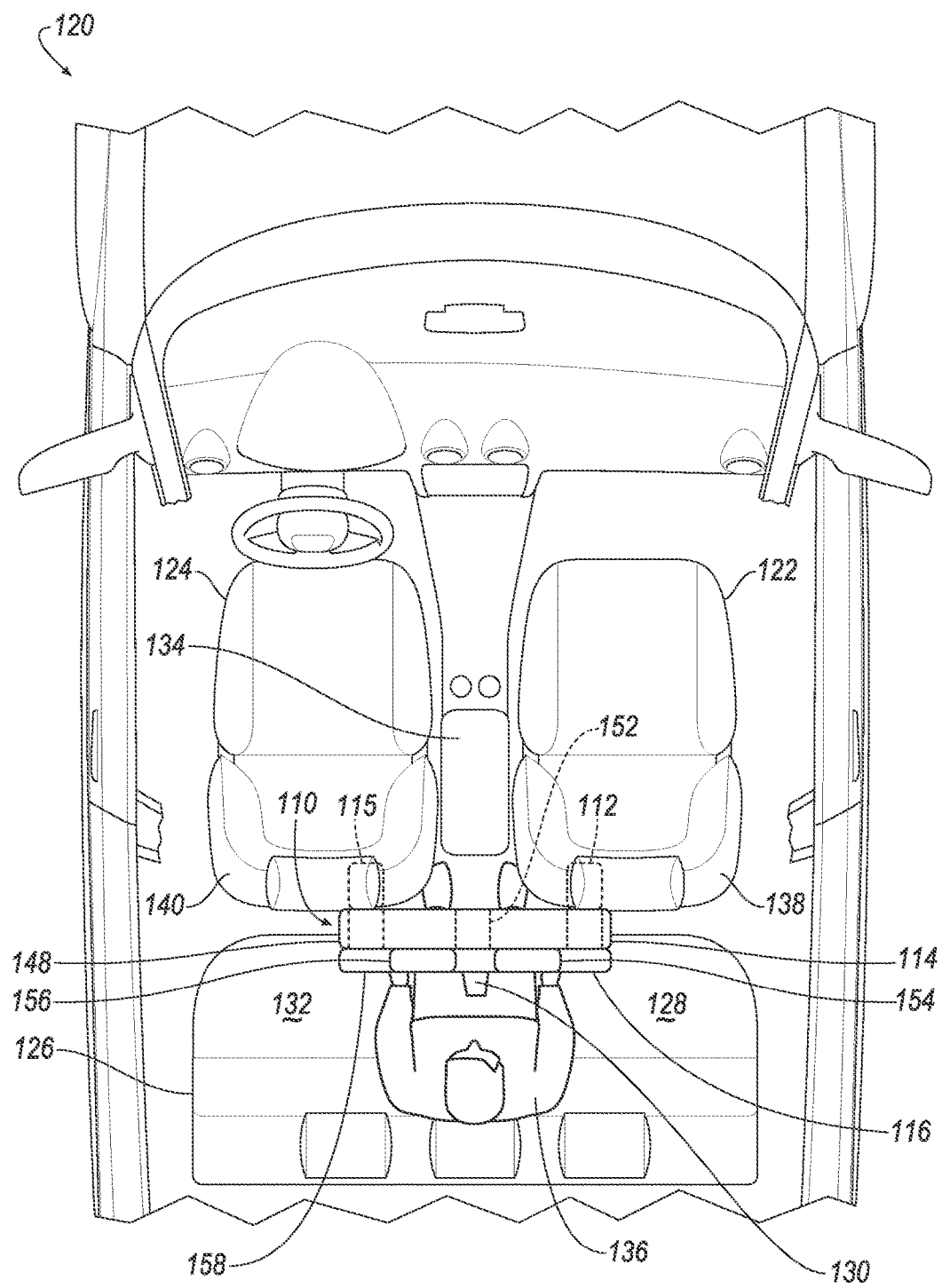
FIG. 4 is a top view of a second exemplary airbag in a deployed condition.
Figure 5:
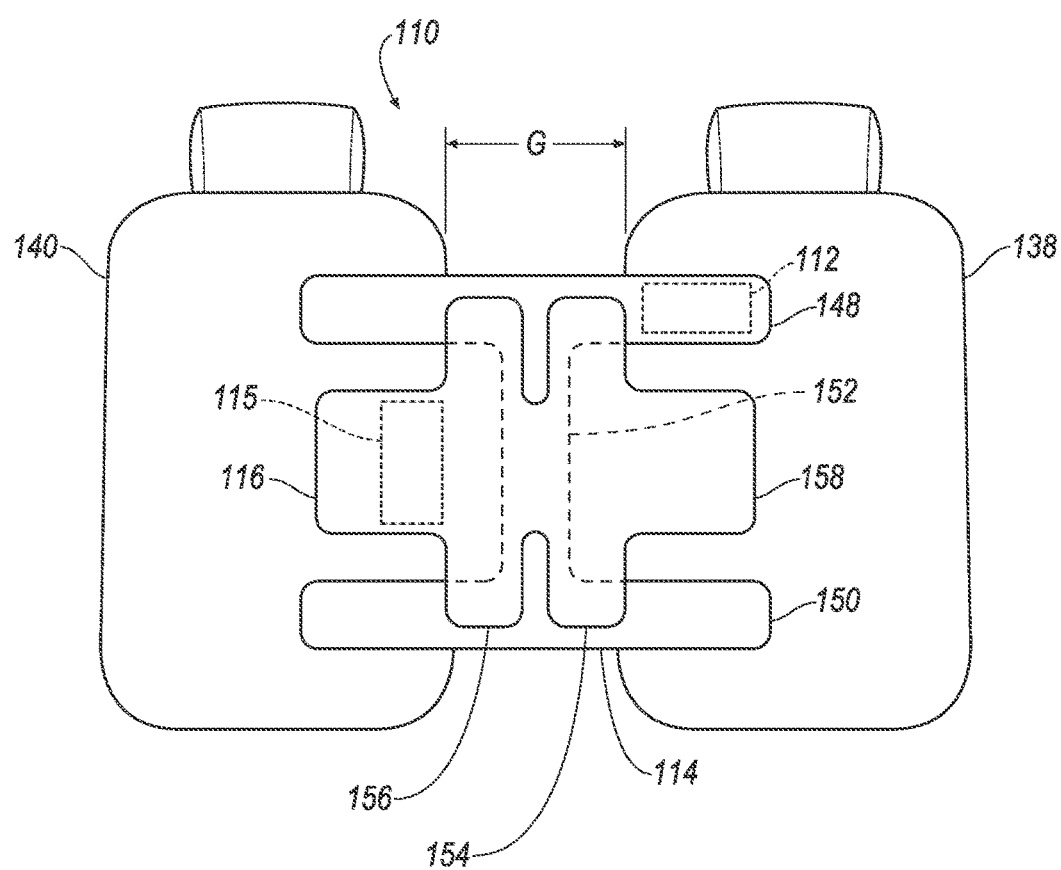
FIG. 5 is schematic rear view of the exemplary airbag of FIG. 4.

A first embodiment of a disclosed airbag system is illustrated in FIGS. 1, 2, and 3 and a second embodiment is illustrated in FIGS. 4 and 5. The embodiments will be described and discussed in that order.

The first embodiment is an airbag system 10. Airbag system 10 includes an exemplary airbag module 12, described in more detail below and shown in FIG. 3, includes an airbag, a base bracket, a cover and an inflator. A two-part air bag, comprising a first airbag 14 and a second airbag 16 is illustrated in FIGS. 1 and 2 with airbags 14 and 16 in their respective deployed or inflated conditions. Prior to inflation, airbags 14 and 16 are disposed inside of module 12.

An exemplary vehicle 20 is illustrated with five seats positions in two rows. Seating positions in the front row include a front passenger position defined by a front passenger's seat 22 and a driver's position defined by a driver's seat 24. In an exemplary rear row, seating positions are defined by an exemplary rear bench seat 26 with the positions being labeled as a right rear passenger position 28, a center rear passenger position 30, and a left rear passenger position 32.

Front seats 22 and 24 are separated by an exemplary center console 34. An occupant 36 sitting in the center rear passenger position 30 is substantially aligned with console 34. Each of seats 22 and 24 has a seatback, respectively a first seatback 38 and a second seatback 40. An inboard side of each seatback 38 and 40 is proximate to console 34. Seatbacks 38 and 40 are separated by a gap G. First airbag module 12 is shaped for mounting within first seatback 38 and is mounted therein. Airbag 14, when in the inflated condition, is sized to span gap G between seatbacks 38 and 40, engaging each of seatbacks 38 and 40. Airbag 16, when in the inflated condition, is sized to occupy most of the space between seatbacks 38 and 40.

Exemplary airbag module 12 is illustrated in FIG. 3. The construction of airbag modules is well known in the art of airbag systems. An exemplary base bracket 42 receives integrated airbags 14 and 16 in a deflated and folded condition. Airbags 14 and 16 are integrated in that they are physically connected to each other and have adjoining inner chambers that allow both airbags 14 and 16 to be inflated by a single source of pressurized gas. An exemplary tearable cover 44 prevents airbags 14 and 16 from unfolding before deployment. An inflator 46 is disposed against bracket 42 on a side opposite airbags 14 and 16. Although such a connection is not shown in the figures, inflator 46 is either directly or indirectly connected to airbags 14 and 16 to enable inflation of airbags 14 and 16 during deployment.

The second embodiment is an airbag system 110, illustrated in FIGS. 4 and 5. Airbag system 110 includes exemplary first and second airbag modules, 112 and 115 respectively. Exemplary first airbag module 112 includes a first airbag 114, a base bracket, a cover and an inflator. Second airbag module 115 includes a second airbag 116, a base bracket, a cover and an inflator. Airbags 114 and 116 are illustrated in their respective inflated conditions. Prior to inflation, airbags 114 and 116 are disposed inside of modules 112 and 115. Although not illustrated, the brackets, covers and inflators of modules 112 and 115 are similar to those of module 12 illustrated in FIG. 3.

An exemplary vehicle 120 is illustrated with five seats positions in two rows. Seating positions in the front row include a front passenger position defined by a front passenger's seat 122 and a driver's position defined by a driver's seat 124. In an exemplary rear row, seating positions are defined by an exemplary rear bench seat 126 with the positions being labeled as a right rear passenger position 128, a center rear passenger position 130, and a left rear passenger position 132.

Front seats 122 and 124 are separated by an exemplary center console 134. An occupant 136 sitting in the center rear passenger position 130 is substantially aligned with console 134. Each of seats 122 and 124 has a seatback, first seatback 138 and second seatback 140 respectively. An inboard side of each seatback 138 and 140 is proximate to console 134. Seatbacks 138 and 140 are separated by a gap G. First airbag module 112 is shaped for mounting within first seatback 138 and is mounted therein. Second airbag module 115 is shaped for mounting within second seatback 140 and is mounted therein.

First airbag 114 includes a first or upper transverse member 148 and a second or a second or lower transverse member 150 and a first or vertical connecting member 152. In the inflated condition, the transverse members 148 and 150 extend across the gap G and have engagement portions extending beyond gap G, engaging seatbacks 138 and 140. The vertical connecting member 152 is disposed between and fluidly connected to transverse members 148 and 150. Exemplary members 148, 150 and 152 are coplanar.

Second airbag 116 includes a first vertical member 154 and a second vertical member 156 and a transverse connecting member 158. In the inflated condition, the transverse connecting member 158 is sized to extend from the second module 115 to the first seatback 138. The vertical members 154 and 156 extend substantially in parallel with the vertical connecting member 152 of first airbag 112 in their respective inflated conditions. Exemplary members 154, 156 and 158 are coplanar.

Airbags 114 and 116 are shaped and modules 112 and 115 positioned for cooperative deployment of airbags 114 and 116 from the respective seatbacks 138 and 140. The deployment of airbags 114 and 116 is cooperative in the sense that neither airbag blocks the other from reaching its design-intent inflated position and orientation. This cooperation is achieved primarily with the shape of the airbags 114 and 116, as the airbags will be deployed substantially simultaneously. Exemplary first airbag 114 leaves exposed an area over second airbag module 115, allowing second airbag 116 to deploy unimpeded by first airbag 114. Similarly, exemplary second airbag 116 leaves an area exposed over first airbag module 112, allowing first airbag 114 to deploy substantially unimpeded by second airbag 116.

Processing

In operation during a conventional direct frontal impact event, airbags 14 and 16 are expanded from an undeployed shape (FIG. 3) to a deployed shape (FIG. 1 and FIG. 2) upon the sensing of an impact event. Deployment occurs with the release of pressurized gas from inflator 46 into exemplary airbags 14 and 16. First airbag 14 extends across the gap G between seatbacks 38 and 40 and overlaps seatbacks 38 and 40. Second airbag 16 projects between seatbacks 38 and 40. The frontal impact event results in a sudden deceleration of vehicle 20. Occupant 36 will, due to his/her inertia, continue moving forward, even when restrained by restraints such as seat belts. With such forward movement, occupant 36's upper body will tip or otherwise move forward, pressing against airbag 14 with airbag 14 deflecting much like a beam. Airbag 16 provides a localized increased cross sectional thickness of the combined structure of airbags 14 and 16, and increases the resistance of the aggregate structure to bending in the area of gap G where deflection would otherwise be greater. The resistance of airbags 14 and 16 to deflection is also a function of inflation pressure. Controlled venting of airbags 14, 16, well known in the art of airbags, cushions occupant 36 during the impact event and reduces trauma to occupants.

The operational sequence is much the same when airbags 114 and 116 are dispensed from separate modules 112 and 115. In operation during a conventional direct frontal impact event, airbags 114 and 116 are expanded from an undeployed shape to a deployed shape (FIG. 4 and FIG. 5) upon the sensing of an impact event. Deployment occurs with the release of pressurized gas from the respective inflators of modules 112 and 115 into exemplary airbags 114 and 116. First and second transverse members 148, 150 of airbag 114 extend across gap G between seatbacks 138 and 140, engaging seatbacks 138 and 140. Transverse connecting member 158 of second airbag 116 extends from seatback 140 and over a rearward side of airbag 138. The frontal impact results in a sudden deceleration of vehicle 20. Occupant 36 will, due to his/her inertia, continue moving forward, even when restrained by restraints such as seat belts. With such forward movement, occupant 136's upper body will tip or otherwise move forward, pressing against airbag 116, with airbag 116 responsively deforming. Airbag 116 provides a cushioning initial engagement surface engaged by occupant 136. Airbag 114 stiffens and supports airbag 116 in gap G where deflection would otherwise be greater. A magnitude of deflection of airbags 114 and 116 responsive to a given force is a function of a bending stiffness of the elements of airbags 114 and 116, which is a function of their respective inflated cross sections and the pressure inside of airbags 114 and 116. Controlled venting of airbags 114, 116 cushions occupant 36 during the impact event reduces trauma to occupants and especially occupant knees during an impact.

The disclosed deployable airbags 14, 16, 114, 116 and airbag systems 10, 110 effectively protect rear seat center occupants 36 in a frontal impact.

CONCLUSION

An airbag system for protecting rear seat center occupants has been disclosed.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In the drawings, the same reference numbers indicate the same elements. Further, some or all of these elements could be changed. Alternative embodiments include alternative locations for modules 12, 112 and 115, and varying dimensions and features of the airbags 14, 16, 114, 116. For example, an alternative to airbag 116 is shaped to deploy rearwardly, away from seatback 138, to include to ensure clearance relative to airbag 114. An extension member may be disposed between airbag 116 and the bracket of module 115 to help space members 154, 156 and 158 away from seatback 140 to further ensure that there is no significant interference between the airbags 114 and 116. A further alternative airbag system, not illustrated, has two air bag modules in a common seatback. In yet another alternative embodiment, the vertical members of second airbag 116 could be integrated into on vertical member. These exemplary alternatives are not comprehensive. In other words, the descriptions of elements herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. An airbag system for use in a passenger vehicle comprising:

a first airbag module shaped for mounting in a first front seatback and including a first bracket, a first airbag in a deflated condition being disposed in the bracket, and an inflator being connected to the airbag;

the first airbag in an inflated condition sized to span a gap between the first front seatback and a second front seatback with the seatbacks; and a second airbag in a deflated condition being included as part of one of the first airbag module and a second airbag module with the second airbag in an inflated condition overlaying the first airbag on one of a forward side and a rearward side.

2. The airbag system of claim 1, wherein the second airbag is fixed to the first airbag in both the deflated condition and the inflated condition.

3. The airbag system of claim 2, wherein in the inflated condition the second airbag is disposed on the forward side of the first airbag and is sized to fit between the seatbacks.

4. The airbag system of claim 3, wherein the first and second airbags are integrated into a single airbag.

5. The airbag system of claim 4, wherein the first airbag in the inflated condition is sized to cover the gap for substantially an entire vertical height of backs of the seatbacks above a console.

6. The airbag system of claim 1, wherein the first and second airbags are substantially separate.

7. The airbag system of claim 6, wherein the second airbag in the deflated condition is disposed in the second airbag module.

8. The airbag system of claim 7, wherein in an inflated condition the second airbag is disposed on the rearward side of the first airbag and is sized to extend across substantially the entire gap between the two seatbacks.

9. The airbag system of claim 8, wherein in the inflated condition, the second airbag module inflates to a lower pressure than the first airbag.

10. The airbag system of claim 7 wherein the airbag modules are shaped for mounting in a common seatback and the airbags are shaped for cooperative deployment from the common seatback.

11. The airbag system of claim 10 wherein the first airbag includes:
a first transverse member,
a lower transverse member with the transverse members extending across the gap in the inflated condition, and
a vertical connecting member disposed between and fluidly connecting the transverse members with the connecting member being substantially centered between the seatbacks.

12. The airbag system of claim 11 wherein the second airbag includes:
a first vertical member and a second vertical member with each extending substantially in parallel with the vertical connecting member in the inflated condition, and
a transverse connecting member extending and fluidly connecting the vertical members and sized to extend from the second module bracket to the other seatback.

13. The airbag system of claim 7 wherein the second airbag module is shaped for mounting in a second seatback and the airbags are shaped for cooperative deployment from the respective seatbacks.

14. The airbag system of claim 13 wherein the first airbag includes:
an first transverse member, and
a lower transverse member with the transverse members extending across the gap, and
a vertical connecting member disposed between and fluidly connecting the transverse members with the connecting member being substantially centered between the seatbacks.

15. The airbag system of claim 13 wherein the second airbag includes:
a first vertical member and a second vertical member with each extending substantially in parallel with the vertical connecting member, and
a transverse connecting member extending and fluidly connecting the vertical members and sized to extend from the second module bracket to the other seatback.

16. An airbag system for use in a passenger vehicle comprising:
a first airbag module shaped for mounting in a first front seatback and including a first bracket, a first airbag in a deflated condition being disposed in the bracket, and a first inflator connected to the airbag, and the first airbag in an inflated condition sized to span a gap between the first front seatback and a second front seatback with the seatbacks;
a second airbag module shaped for mounting in a second front seatback and including a second bracket, a second airbag in a deflated condition being disposed in the bracket, and a second inflator connected to the airbag, and the second airbag in an inflated condition overlaying the first airbag on a rearward side.

17. The airbag system of claim 16, wherein in an inflated condition the second airbag is sized to extend across substantially the entire gap between the two seatbacks.

18. The airbag system of claim 17, wherein in the inflated condition, the second airbag module inflates to a lower pressure than the first airbag.

19. The airbag system of claim 16 wherein the first airbag includes:
an first transverse member, and
a lower transverse member with the transverse members extending across the gap, and
a vertical connecting member disposed between and fluidly connecting the transverse members with the connecting member being substantially centered between the seatbacks.

20. The airbag system of claim 16 wherein the second airbag includes:
a first vertical member and a second vertical member with each extending substantially in parallel with the vertical connecting member, and
a transverse connecting member extending and fluidly connecting the vertical members and sized to extend from the second module bracket to the other seatback.

* * * * *